United States Patent
Kuo et al.

(10) Patent No.: US 6,904,016 B2
(45) Date of Patent: Jun. 7, 2005

(54) PROCESSING UNEXPECTED TRANSMISSION INTERRUPTIONS IN A WIRELESS COMMUNICATIONS SYSTEM

(75) Inventors: Richard Lee-Chee Kuo, Hsin-Chu (TW); Sam Shiaw-Shiang Jiang, Hsin-Chu (TW)

(73) Assignee: ASUSTeK Computer Inc., Taipei (TW)

( * ) Notice: Subject to any disclaimer, the term of this patent is extended or adjusted under 35 U.S.C. 154(b) by 117 days.

(21) Appl. No.: 09/683,085

(22) Filed: Nov. 16, 2001

(65) Prior Publication Data

US 2003/0095519 A1 May 22, 2003

(51) Int. Cl.⁷ .............................. G06F 11/00; H04J 3/16
(52) U.S. Cl. ...................... 370/235; 370/329; 370/349; 370/468
(58) Field of Search ................................ 370/235, 329, 370/349, 468, 335–338, 469–474, 401, 310

(56) References Cited

U.S. PATENT DOCUMENTS

| | | | |
|---|---|---|---|
| 6,363,058 B1 * | 3/2002 | Roobol et al. .............. | 370/310 |
| 6,473,399 B1 * | 10/2002 | Johansson et al. ......... | 370/229 |
| 6,477,670 B1 * | 11/2002 | Ahmadvand ................ | 714/712 |
| 2001/0007137 A1 * | 7/2001 | Suumaki et al. ............ | 714/18 |
| 2001/0033582 A1 * | 10/2001 | Sarkkinen et al. .......... | 370/474 |
| 2002/0041567 A1 * | 4/2002 | Yi et al. ..................... | 370/236 |
| 2002/0090005 A1 | 7/2002 | Jiang et al. | |

OTHER PUBLICATIONS

3 GPP TS 25.322 V5.1.0 (2002–06), 3rd Generation Partnership Projects; Technical Specification Group Radio Access Network; Radio Link Control (RLC) protocol specification (Release 5), pp. 1–76.
3 GPP TS 25.322 V3.8.0 (2001–09).
3 GPP TS 25.321 V3.9.0 (2001–09).

* cited by examiner

*Primary Examiner*—Afsar Qureshi
(74) *Attorney, Agent, or Firm*—Winston Hsu

(57) ABSTRACT

A radio link control (RLC) layer provides RLC entity information to a medium access control (MAC) layer. The RLC entity information indicates that the RLC layer has service data unit (SDU) data to be transmitted. After providing the RLC entity information, the RLC layer receives an unexpected data interruption that requires the RLC layer to discard or interrupt transmitting the SDU data. After the unexpected data interruption, the MAC layer requests at least a protocol data unit (PDU) from the RLC layer in response to the RLC entity information. The RLC layer then submits to the MAC layer at least one padding PDU in response to the MAC request. The padding PDU is submitted in place of the discarded SDU data. Alternatively, the affected SDU data is not discarded until the next transmission time interval (TTI).

20 Claims, 10 Drawing Sheets

PROCESSING UNEXPECTED TRANSMISSION INTERRUPTIONS IN A WIRELESS COMMUNICATIONS SYSTEM

BACKGROUND OF INVENTION

1. Field of the Invention

The present invention relates to the handling of unexpected scheduling interruptions in data transmission for a wireless device. More specifically, the handling of scheduling interruptions between a radio link control (RLC) layer and a medium access control (MAC) layer is considered.

2. Description of the Prior Art

Many communications protocols typically utilize a three-layered approach to communications. Please refer to FIG. 1. FIG. 1 is a block diagram of the three layers in such a communications protocol. In a typical wireless environment, a first station 10 is in wireless communications with one or more second stations 20. An application 13 on the first station 10 composes a message 11 and has it delivered to the second station 20 by handing the message 11 to a layer 3 interface 12. The layer 3 interface 12 may also generate layer 3 signaling messages 12a for the purpose of controlling layer 3 operations between the first station 10 and the second station 20. An example of such a layer 3 signaling message is a request for ciphering key changes, which are generated by the layer 3 interfaces 12 and 22 of both the first station 10 and second station 20, respectively. The layer 3 interface 12 delivers either the message 11 or the layer 3 signaling message 12a to a layer 2 interface 16 in the form of layer 2 service data units (SDUs) 14. The layer 2 SDUs 14 may be of any size, and hold the data that the layer 3 interface 12 wishes delivered to the second station 20, be it data from the signaling message 12a or from the application message 11. The layer 2 interface 16 composes the SDUs 14 into one or more layer 2 protocol data units (PDUs) 18. Each layer 2 PDU 18 is of a fixed size, and is delivered to a layer 1 interface 19. The layer 1 interface 19 is the physical layer, transmitting data to the second station 20. The transmitted data is received by the layer 1 interface 29 of the second station 20 and reconstructed into one or more PDUs 28, which are passed up to the layer 2 interface 26. The layer 2 interface 26 receives the PDUs 28 and from them assembles one or more layer 2 SDUs 24. The layer 2 SDUs 24 are passed up to the layer 3 interface 22. The layer 3 interface 22, in turn, converts the layer 2 SDUs 24 back into either a message 21, which should be identical to the original message 11 that was generated by the application 13 on the first station 10, or a layer 3 signaling message 22a, which should be identical to the original signaling message 12a generated by the layer 3 interface 12 and which is then processed by the layer 3 interface 22. The received message 21 is passed to an application 23 on the second station 20. As a note regarding terminology used throughout this disclosure, a PDU is a data unit that is used by a layer internally to transmit and receive information, whereas an SDU is a data unit that is passed up to, or received from, an upper layer. Thus, a layer 3 PDU is exactly the same as a layer 2 SDU. Similarly, a layer 2 PDU could also be termed a layer 1 SDU. For purposes of the following disclosure, the shortened term "SDU" is used to indicate layer 2 SDUs (that is, layer 3 PDUs), and the term "PDU" should be understood as layer 2 PDUs (i.e., layer 1 SDUs).

Of particular interest is the layer 2 interface, which acts as a buffer between the relatively high-end data transmission and reception requests of the layer 3 interface, and the low-level requirements of the physical transmission and reception process. Please refer to FIG. 2. FIG. 2 is a diagram of a transmission/reception process from a layer 2 perspective. A layer 2 interface 32 of a transmitter 30, which may be either a base station or a mobile unit, receives a string of SDUs 34 from a layer 3 interface 33. The SDUs 34 are sequentially ordered from 1 to 5, and are of unequal sizes, as indicated by unequal lengths in the figure. The layer 2 interface 32 converts the string of SDUs 34 into a string of PDUs 36. The layer 2 PDUs 36 are sequentially ordered from 1 to 4, and are all of an equal length. The string of PDUs 36 is then sent off to the layer 1 interface 31 for transmission. A reverse process occurs at the receiver end 40, which may also be either a base station or a mobile unit, with a receiver layer 2 interface 42 assembling a received string of layer 2 PDUs 46 into a received string of layer 2 SDUs 44. Under certain transport modes, the multi-layered protocol will insist that the receiver layer 2 interface 42 presents the SDUs 44 to the layer 3 interface 43 in order. That is, the layer 2 interface 42 must present the SDUs 44 to the layer 3 interface 43 in the sequential order of the SDUs 44, beginning with SDU 1 and ending with SDU 5. The ordering of the SDUs 44 may not be scrambled, nor may a subsequent SDU be delivered to layer 3 until all of the prior SDUs have been delivered.

In line transmissions, such a requirement is relatively easy to fulfill. In the noisy environment of wireless transmissions, however, the receiver 40, be it a base station or a mobile unit, often misses data. Additionally, under some transmission modes, the layer 2 interface 32 of the transmitter 30 may actually discard some of the layer 2 SDUs 34 after a predetermined amount of time if the layer 2 SDUs 34 have been excessively delayed. This is due to a so-called discard timer, which is set for each SDU 34. When a discard timer for an SDU 34 expires, the SDU 34 is discarded, as well as any PDUs 36 associated with the SDU 34. Some layer 2 PDUs 46 in the received string of layer 2 PDUs 46 will therefore be missing, either due to deliberate discarding from the transmitting side 30, or from improper reception on the receiver side 40. Thus, ensuring that the layer 2 SDUs 44 are presented in order can pose a significant challenge. Even in an out-of-sequence delivery mode, in which the sequentially ordered delivery of the SDUs 44 is not enforced, a layer 2 SDU 44 cannot be presented until all of its composing layer 2 PDUs 46 have been correctly received.

Wireless protocols are carefully designed to address such problems. Generally speaking, there are two broad modes for transmitting and receiving data: acknowledged mode (AM) transport, and unacknowledged mode (UM) transport. For acknowledged mode data, the receiver 40 sends a special layer 2 acknowledging signal to the transmitter 30 to indicate successfully received layer 2 PDUs 46. AM PDUs 46 that are not successfully received can therefore be re-transmitted by the transmitter 30 to ensure proper reception. No such signaling is performed for UM data, and hence there is no re-transmission of UM PDUs 36. For purposes of the present invention, AM data is used by way of example, though UM data is equally applicable to the present discussion. Please refer to FIG. 3 with reference to FIG. 1. FIG. 3 is a simplified block diagram of an acknowledged mode data PDU 50, as defined in the 3GPP™ TS 25.322 V3.8.0 specification, which is included herein by reference. In general, there are two types of PDUs: a control PDU or a data PDU. Control PDUs are used by the layer 2 interfaces 16 and 26 to control data transmission and reception protocols, such as the above-mentioned layer 2 acknowledging signal that is used to acknowledge received data.

This is somewhat analogous to the exchange of the signaling messages 12a and 22a of the layer 3 interfaces 12 and 22. However, the layer 2 interfaces 16 and 26 do not interpret or recognize the layer 3 signaling messages 12a and 22a (they are simply treated as SDU data), whereas the layer 2 interfaces 16 and 26 do recognize layer 2 control PDUs, and do not hand layer 2 control PDUs up to the layer 3 interfaces 12 and 22. Data PDUs are used to transmit SDU data, which is reassembled and presented to layer 3 as SDUs. The example PDU 50 is a data PDU, and is divided into several fields, as defined by the layer 2 protocol. The first field 51 is a single bit indicating that the PDU 50 is either a data or a control PDU. As the data/control bit 51 is set (i.e., equal to 1), the PDU 50 is marked as a data PDU. The second field 52 is a sequence number field 52, and for AM transport is twelve bits long. Successive PDUs 18, 28 have successively higher sequence numbers 52, and in this way the second station 20 can properly reassembled layer 2 PDUs 28 to form layer 2 SDUs 24. For example, if a first PDU 18 is transmitted with a sequence number 52 equal to 536, a sequentially next PDU 18 would be transmitted with a sequence number 52 equal to 537, and so forth. A re-transmitted PDU 18 may have a sequence number 52 of 535, indicating that it is to be inserted sequentially prior to the PDU 18 with a sequence number of 536, though it was physically received at a later time. By assembling received data PDUs 50 in their proper sequential order according to their respective sequence numbers 52, the correct reconstruction of SDU data is ensured. The sequence number 52 enables re-transmitted PDUs 50 to be inserted into their proper sequential position with respect to other received PDUs 50. In this manner, the re-transmission of data is supported. A single polling bit 53 follows the sequence number field 52, and when set indicates that the receiver (i.e., the second station 20) should respond with an acknowledgment status PDU, which is one kind of control PDU that is used to indicate the reception status of received PDUs 28. The first station 10 sets the polling bit 53 to 1 to request the second station 20 to send an acknowledgment status control PDU. Bit 54 is reserved and is cleared to zero. The next bit 55a is an extension bit, and when set indicates the presence of an immediately following length indicator (LI). An LI may be either 7 bits long or 15 bits long, and is used to indicate the ending position of a layer 2 SDU within the layer 2 PDU 50. If a single SDU completely fills the data region 58 of the PDU 50, then the bit 55a would be zero, thereby indicating that no LI is present. In the example PDU 50, however, there are two layer 2 SDUs ending in the layer 2 PDU 50: SDU_1 57a and SDU_2 57b. There must, therefore, be two LIs to indicate the respective ends of the SDU_1 57a and the SDU_2 57b. A PDU following the PDU 50 (i.e., sequentially after, as indicated by the sequence number 52) would hold the LI for SDU_3 57c. The first LI, $LI_1$, is in field 56a following the extension bit field 55a, and marks the end of the SDU_1 57a. $LI_1$ 56a has an extension bit 55b that is set, indicating the presence of another LI, $LI_2$ in field 56b. $LI_2$ 56b indicates the ending position of the SDU_2 57b, and has an extension bit 55c that is cleared, signifying that there are no more LIs, and that a data region 58 is thus beginning. The data region 58 is used to hold the actual SDU data.

Please refer to FIG. 4 in conjunction with FIG. 5. FIG. 4 is a more detailed block diagram of a prior art layer 2 interface 60. FIG. 5 is a timing diagram of transmission time intervals (TTIs) 72. The layer 2 interface 60 comprises a radio link control (RLC) layer 62 on top of, and in communications with, a medium access control (MAC) layer 64. Such an arrangement can be found, for example, in the 3GPP™ specification TS 25.321 V3.9.0, which is included herein by reference. The MAC layer 64 acts as an interface between the RLC layer 62 and the layer 1 interface 61. From an upper-layer perspective (the RLC layer 62 and higher layers), many channels may be established, each with its own transport parameters. Functionally, however, these channels must be consolidated into a single stream for presentation to the physical layer 1 interface 61. This is one of the main purposes of the MAC layer 64. The MAC layer 64 divides the transmission of PDUs 63, which the MAC layer 64 receives from each RLC layer 62, into a series of transmission time intervals (TTIs) 72 for that channel. For each channel, every TTI 72 for that channel has an interval length that is identical to the other TTIs 72 for that channel, such as a 20 milliseconds (ms) interval. However, TTIs 72 may vary in duration from channel to channel, that is, from RLC layer 62 to RLC layer 62. For the present discussion, only a single channel (i.e., a single RLC layer 62) is assumed, though multiple channels are possible. Within the time span of each TTI 72 for the channel, the MAC layer 64 sends off a set 74 of transport blocks 74a to the layer 1 interface 61 to be transmitted. The set 74 of transport blocks 74a consists of a predetermined number of the transport blocks 74a. Each of the transport blocks 74a comprises one RLC PDU 75 and may optionally carry a MAC header 76. Within a TTI 72, the RLC PDUs 75, and thus the transport blocks 74a within the TTI 72, are all of the same length. The number of RLC PDUs 75 (i.e., transport blocks 74a) within each transport block set 74 between TTIs 72 may change. For example, in FIG. 5 the first TTI 72 transmits six PDUs 75, and the subsequent TTI 72 transmits three PDUs 75. The actual data size of the PDUs 75 may also vary from TTI 72 to TTI 72, but is always the same within each TTI 72. Consequently, prior to transmission for each TTI 72, the MAC layer 64 informs the RLC layer 62 of the number of PDUs 75 required for the TTI 72, and the size requirements the PDUs 75 within the TTI 72. This is termed transport format combination (TFC) selection, and is used to schedule the transmission of data from the RLC layer 62 to the MAC layer 64. TFC selection enables the MAC layer 64 to juggle the various requirements of the RLC layers 62 to most efficiently stream data into the physical layer 1 61. The RLC layer 62 composes SDUs 65a, held in a buffer 65, into appropriately sized PDUs 65b, and delivers the required number of PDUs 65b to the MAC layer 64, as required by the TFC selection. As noted, the MAC layer 64 may optionally add a MAC header 76 to each RLC PDU 75 to generate the transport blocks 74a for the transport block set 74, and then the transport block set 74 containing the PDUs 65b is sent off to the layer 1 interface 61 for transmission.

Please refer to FIG. 6 with reference to FIG. 4. FIG. 6 is a timing diagram for TFC selection according to the prior art. To send off at least a portion of the SDU data 65a in a TTI 82, TFC selection is performed in a TTI 81 immediately prior to the TTI 82. Within the TTI 81, the RLC layer 62 present RLC entity information 84 to the MAC layer 64. The RLC entity information 84 informs the MAC layer 64 of how much SDU data 65a the RLC layer 62 has awaiting transmission. The MAC layer 64 responds to the RLC entity information 84 with a TFC data request 86. The TFC data request 86 instructs the RLC layer 62 of the number of PDUs 65b to submit to the MAC layer 64, and the size of the PDUs 65b so submitted. This may or may not be sufficient to cover all of the SDU data 65a. In the event that it is not, the RLC layer 62 would have to perform another TFC selection process within the TTI 82 to transmit the remaining SDU data 65a in a subsequent TTI 83. In either event, the RLC layer 62 segments the appropriate number of SDUs 65a into the requested number of properly sized PDUs 65b. These PDUs 65b are delivered as a block 88 to the MAC layer 64. Within the TTI 82, the MAC layer 64 processes the block 88 for delivery to the layer 1 interface 61, and TFC selection is repeated in TTI 82 for data transmission in TTI 83. The SDUs 65a that have been segmented into PDUs 65b can be removed from the buffer 65.

SDUs 65a may also be removed from the buffer 65 due to timeout. Each SDU 65a can have an expiration time, which is tracked by a discard timer. If the discard timer indicates that an SDU 65a has exceeded its expiration time, the expired SDU 65a is removed from the buffer 65 and so is no longer available for transmission. From the perspective of the RLC layer 62, this is a seemingly random event that may occur at any time. In particular, such a discarding event may occur after the submission of the RLC entity information 84, leaving the RLC layer 62 with less (or even no) SDU data 65a than was indicated in the RLC entity information 84. However, once the MAC layer 64 responds to the RLC entity information 84 with the TFC data request 86, the RLC layer 62 must provide the appropriate block 88 having the requisite number of, and sized, PDUs 65b. Failure to do so can lead to software failure of the wireless device. This is a criticality in the scheduling of data transmission between the RLC layer 62 and the MAC layer 64, and has been accounted for in the prior art. In the event that an SDU 65a is to be discarded due to timeout from a discard timer, and if the RLC layer 62 has already indicated to the MAC layer 64 that the SDU 65a is ready for transmission in the RLC entity information 84, actual discarding of the SDU 65a is delayed until the TTI 82. By doing so, the RLC layer 62 is assured of having sufficient SDU data 65a to form the block 88. In the event that the expired SDU 65a is not required for the block 88, the expired SDU 65a may be safely discarded in the TTI 82 prior to the next TFC selection event for the TTI 83.

However, other unexpected data interruption events may occur, which the prior art is unable to handle. Please refer back to FIG. 1 with reference to FIGS. 4 and 6. Most of these unexpected data interruptions are the result of command primitives sent from the layer 3 interface 12 to the layer 2 interface 16, and hence are unexpected data interruptions from the standpoint of the RLC layer 62. These include stop, suspend and re-establish command primitives. Additionally, a layer 2 reset event can also be a source of unexpected data interruptions. The layer 3 interface 12 initiates a stop operation on the layer 2 interface 16 when the layer 3 interface 12 decides to change base stations. A stop event requires the layer 2 interface 12 to immediately stop transmitting SDU data 65a. Hence, the PDUs 65b are effectively pulled from being delivered to the MAC layer 64, even though a TFC data request 86 may be pending. A re-establish operation is initiated by the layer 3 interface 12 with a re-establish command primitive sent from the layer 3 interface 12 to the layer 2 interface 16 to reestablish a channel. As the name of the command primitive indicates, a channel is completely shut down, and then re-established. All SDU data 65a, and associated PDUs 65b, are thus necessarily discarded when the channel is shut down. Again, this may leave the MAC layer 64 hanging from an unfulfilled TFC data request 86 for the channel being re-established. A suspend operation is performed by the layer 3 interface 12 when the layer 3 interface 12 decides to change the ciphering configuration between the first station 10 and the second station 20. A suspend primitive is issued from the layer 3 interface 12 to the layer 2 interface 16 with a parameter "n". This parameter "n" instructs the layer 2 interface to stop transmitting data after "n" more PDUs 65b have been sent. The purpose of this parameter "n" is to allow sufficient time, in terms of PDUs 65b, for the first station 10 to perform ciphering key synchronization with the second station 20. Generally, if "n" is large enough, the RLC layer 62 will have sufficient warning so as to be able to "plan ahead" and not leave a TFC data request 86 unfulfilled. However, if "n" is small, the RLC layer 62 may have to pull PDUs 65b that were already scheduled for transmission, and thus will not be able to fulfill the TFC data request 86. Finally, a reset operation is performed by the layer 2 interface 16 when communication errors are detected along a channel. These errors are, by nature, unexpected events, and either the first station 10 or the second station 20 may initiate a reset operation. A reset operation requires that all state variables and all buffers for a channel be cleared or set to default values. Hence, the SDUs 65a and PDUs 65b are removed under a reset operation, which may leave the MAC layer 64 hanging, awaiting response from the TFC data request 86.

SUMMARY OF INVENTION

It is therefore a primary objective of this invention to provide a method and associated system for processing unexpected transmission interruptions between a radio link control (RLC) layer and a medium access control (MAC) layer in a wireless communications system.

Briefly summarized, the preferred embodiment of the present invention discloses a method and system for data scheduling between a radio link control (RLC) layer and a medium access control (MAC) layer in a wireless communications device. According to the present invention method, the RLC layer provides RLC entity information to the MAC layer. The RLC entity information indicates that the RLC layer has service data unit (SDU) data to be transmitted. After providing the RLC entity information, the RLC layer receives an unexpected data interruption that requires the RLC layer to discard the SDU data. After the unexpected data interruption, the MAC layer requests at least a protocol data unit (PDU) from the RLC layer in response to the RLC entity information. The RLC layer then submits to the MAC layer at least one padding PDU in response to the MAC request. The padding PDU is submitted in place of the discarded SDU data. Alternatively, the affected SDU data is not discarded until the next transmission time interval (TTI).

It is an advantage of the present invention that by always providing the MAC layer with the appropriate amount of data, regardless of data transmission interruptions, the MAC layer data request is always fulfilled and so the danger of software instability is avoided.

These and other objectives of the present invention will no doubt become obvious to those of ordinary skill in the art after reading the following detailed description of the preferred embodiment, which is illustrated in the various figures and drawings.

DETAILED DESCRIPTION

In the following description, it should be noted that transmitters and receivers can include cellular telephones, personal data assistants (PDAs), personal computers (PCs), or other devices that utilize a wireless communications protocol. A wireless communications protocol as discussed in the Background of the Invention is assumed, though the methods of the present invention may be applicable to other wireless systems. The differences between the prior art and the following disclosure, which constitute the present invention, may be readily realized by one skilled in the art through pertinent modification of the prior art according to the disclosure herein.

Figure 1:
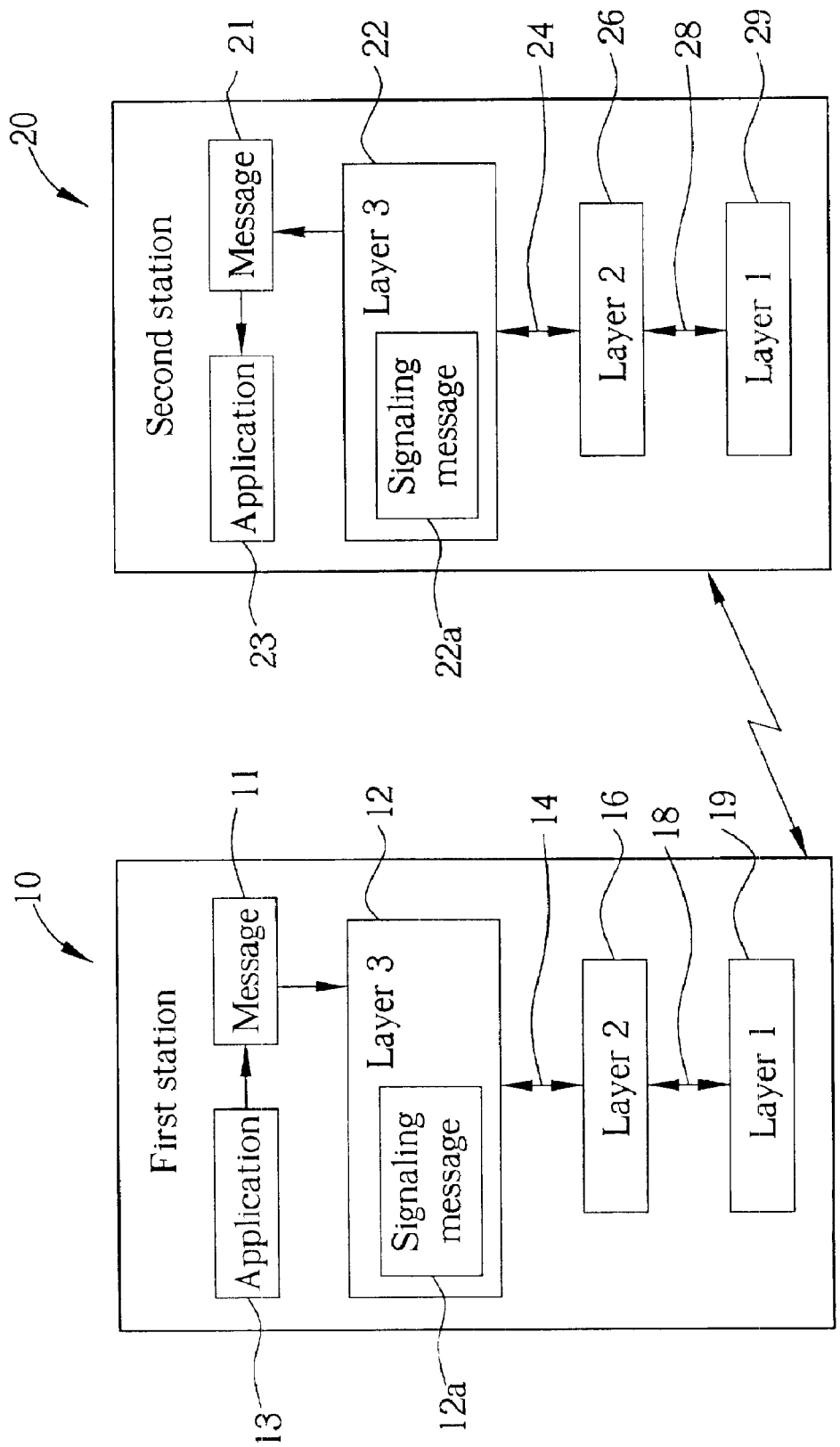
FIG. 1 is a block diagram of a three-layered communications protocol.
Figure 2:
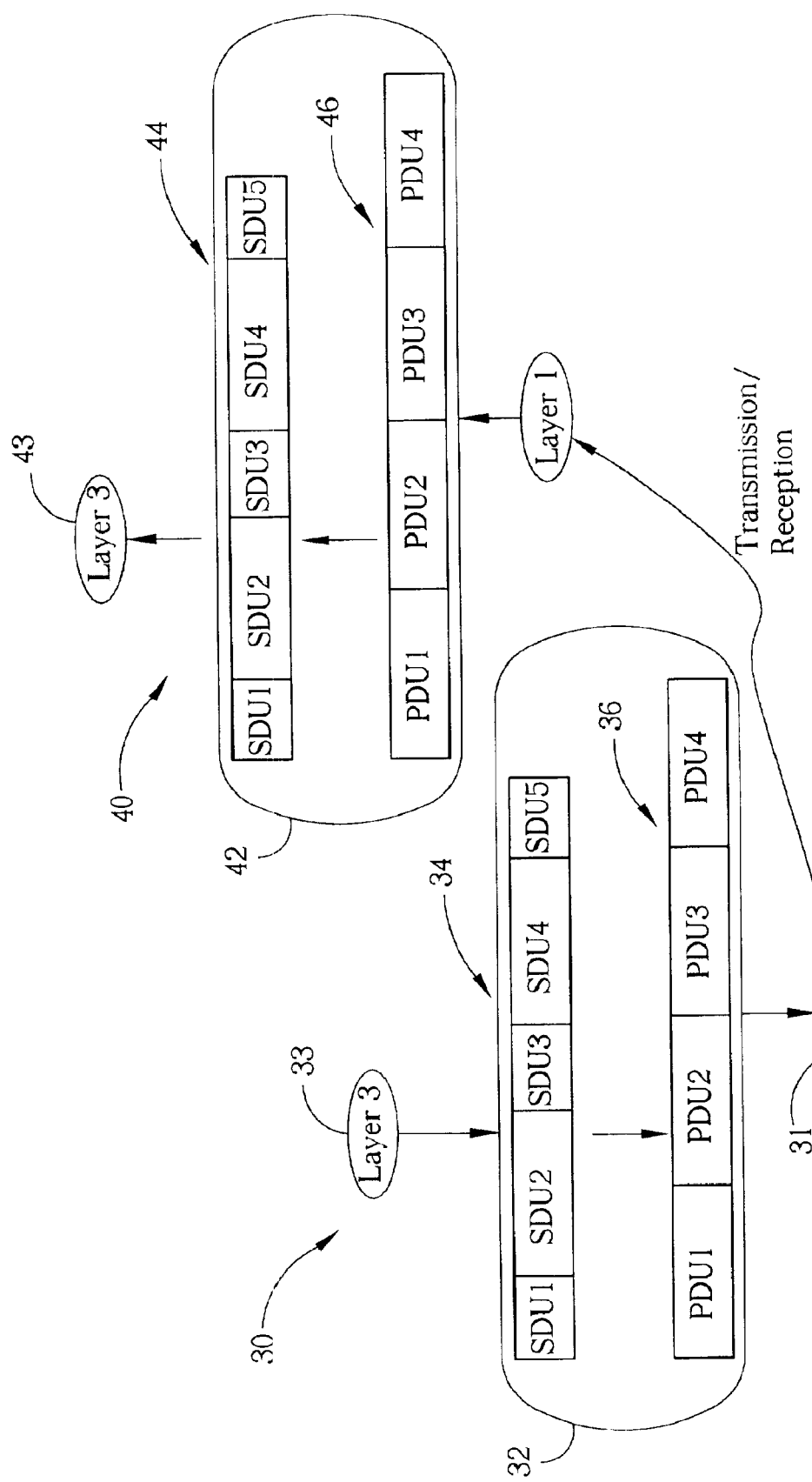
FIG. 2 is a simplified diagram of a transmission/reception process from a layer 2 perspective.
Figure 3:
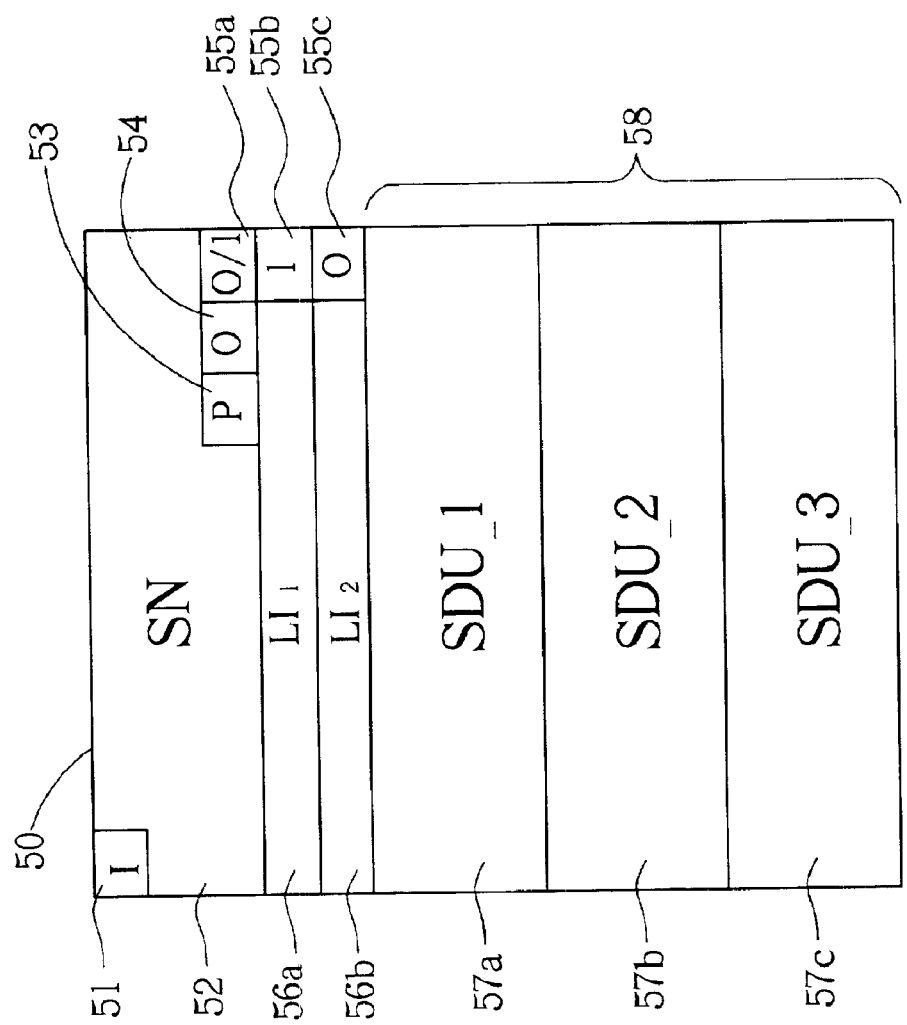
FIG. 3 is a block diagram of an acknowledged mode (AM) protocol data unit (PDU).
Figure 4:
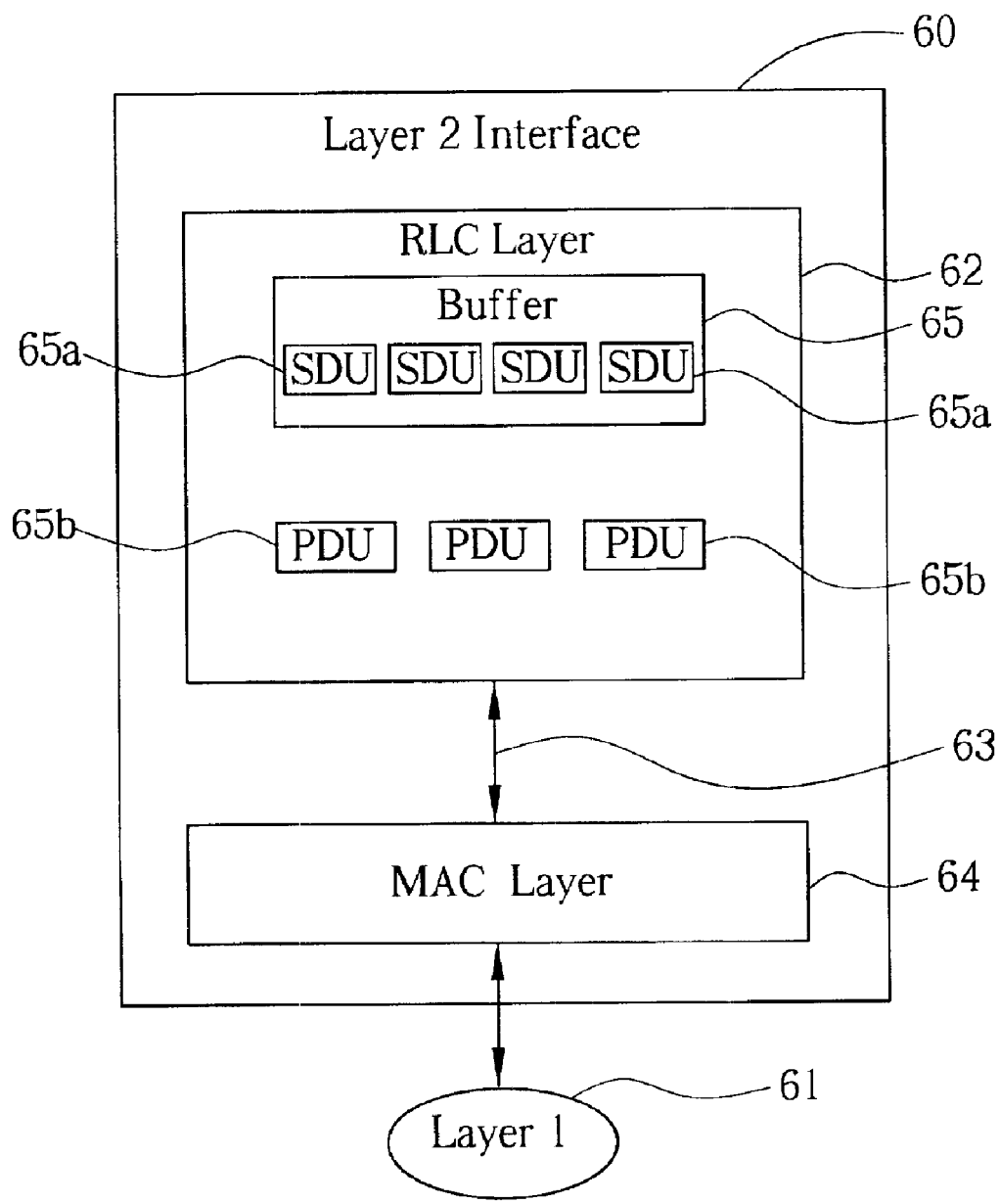
FIG. 4 is a more detailed block diagram of a prior art layer 2 interface.
Figure 5:
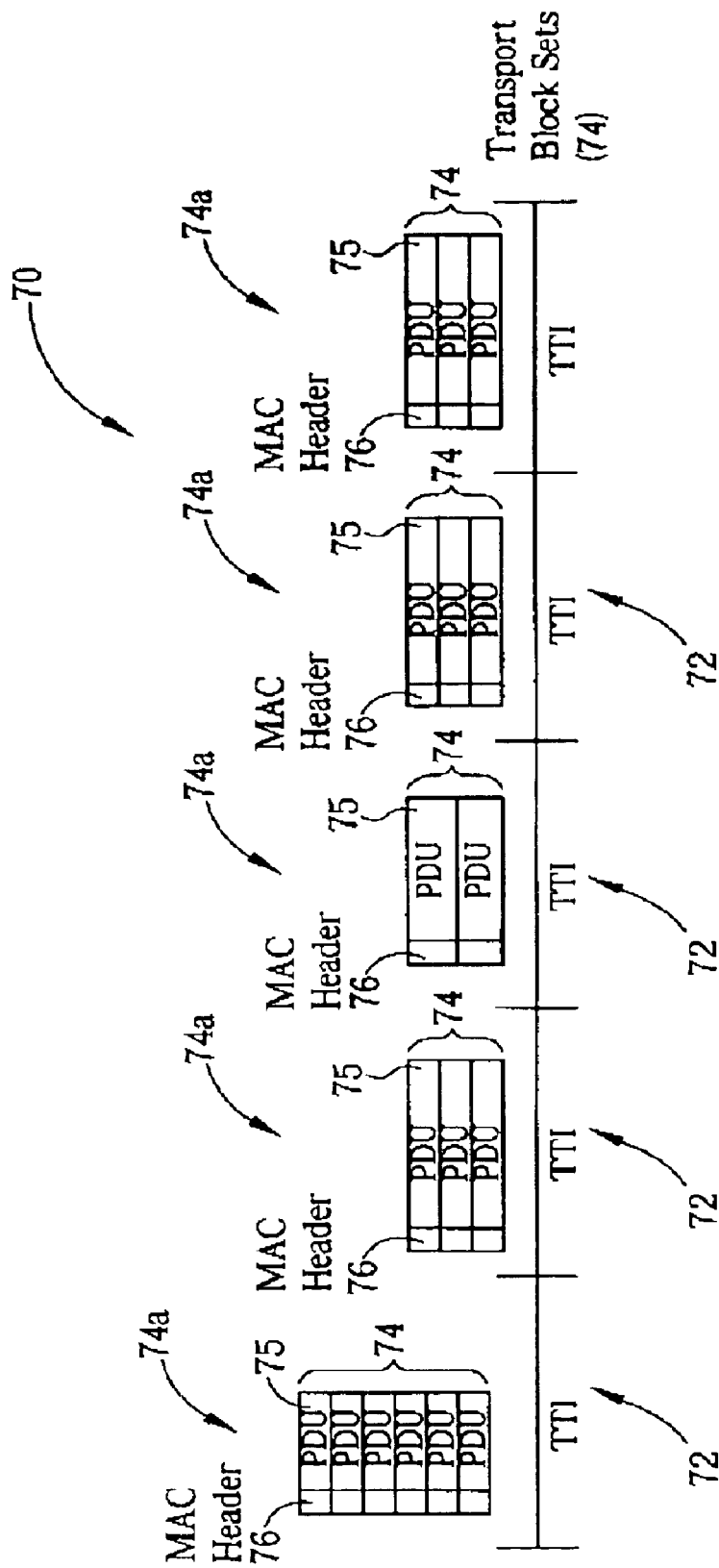
FIG. 5 is a timing diagram of transmission time intervals.
Figure 6:
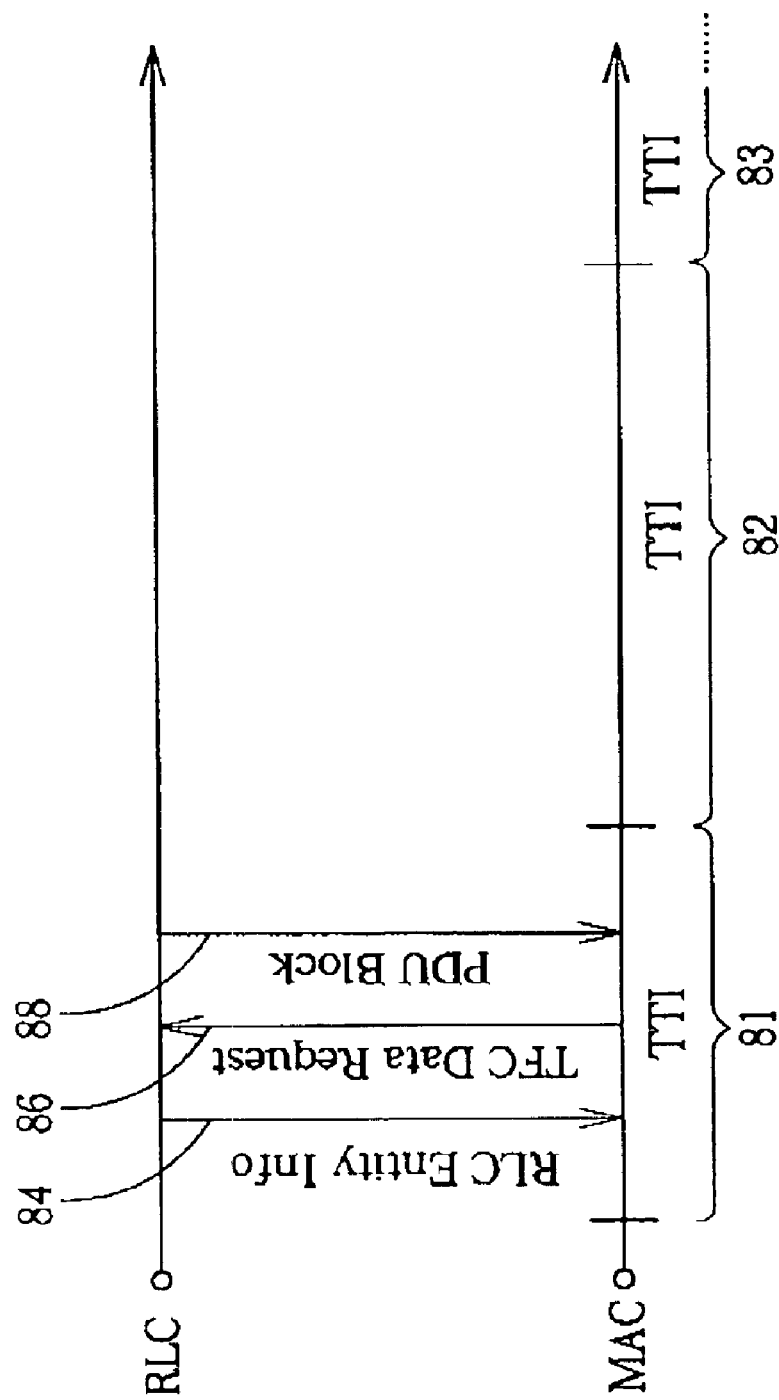
FIG. 6 is a timing diagram for data transmission scheduling according to the prior art.
Figure 7:
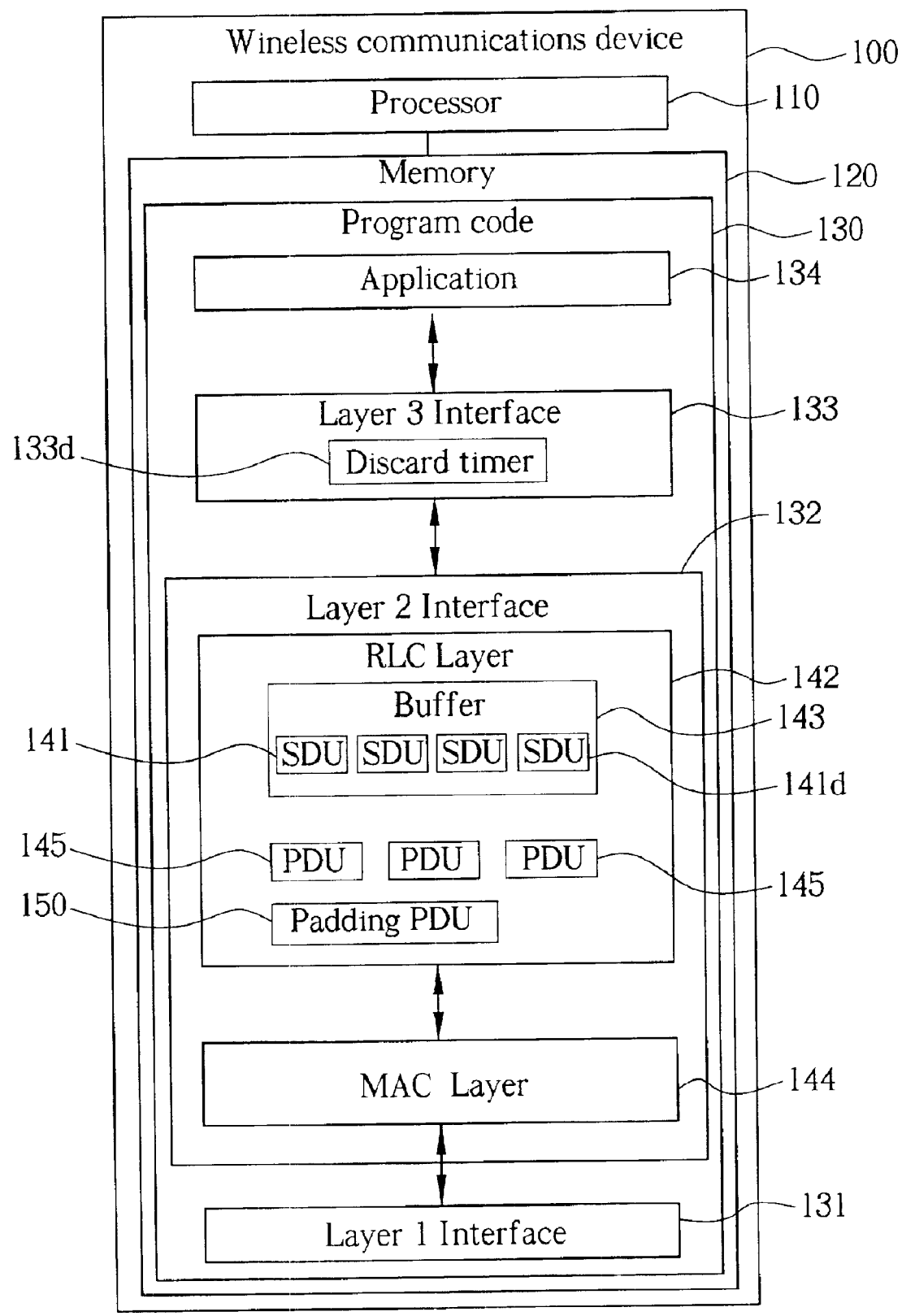
FIG. 7 is a block diagram of a wireless communications device according to the present invention.

Please refer to FIG. 7. FIG. 7 is a block diagram of a wireless communications device 100 according to the present invention. The wireless communications device 100 includes a processor 110 and a memory 120. The memory 120 holds program code 130 that is executed by the processor 110. Of course, other components, obvious to those skilled in the art, are required for the device 100, but are not relevant to the present invention and so ignored for the sake of brevity. The program code 130 is used to implement a wireless communications protocol that includes an application layer 134, a layer 3 interface 133, a layer 2 interface 132 and a layer 1 interface 131. Other arrangements for the processor 110 and memory 120, and how the program code 130 interrelates to the two, are possible, as well as various hardware/software interface considerations for the implementation of the layer 1 interface 131. The block diagram indicated in FIG. 7 is merely the simplest, but by no means the only, arrangement. Regardless of implementation-related aspects, of primary concern to the present invention is the wireless communications protocol itself, and in particular, the layer 2 interface 132.

The layer 2 interface 132 is itself divided into layers, which include a radio link control (RLC) layer 142 on top of a medium access control (MAC) layer 144. The RLC layer 142 is in communications with the layer 3 interface 133, receiving layer 3 data in the form of service data units (SDUs) 141 that are stored in a buffer 143. The RLC layer 142 also receives command primitives from the layer 3 interface 133, such as the suspend, stop and re-establish primitives discussed earlier. The RLC layer 142 uses the SDUs 141 to generate protocol data units (PDUs) 145 that are sent to the MAC layer 144 for transmission. The size and number of PDUs 145 delivered to the MAC layer 144 is dictated by a transport format combination (TFC) data request sent to the RLC layer 142 from the MAC layer 144. The MAC layer 144 sends the TFC data request to the RLC layer 142 after the RLC layer 142 has indicated that there is SDU data 141 to be delivered, such information coming in the form of RLC entity information.

Figure 8A:
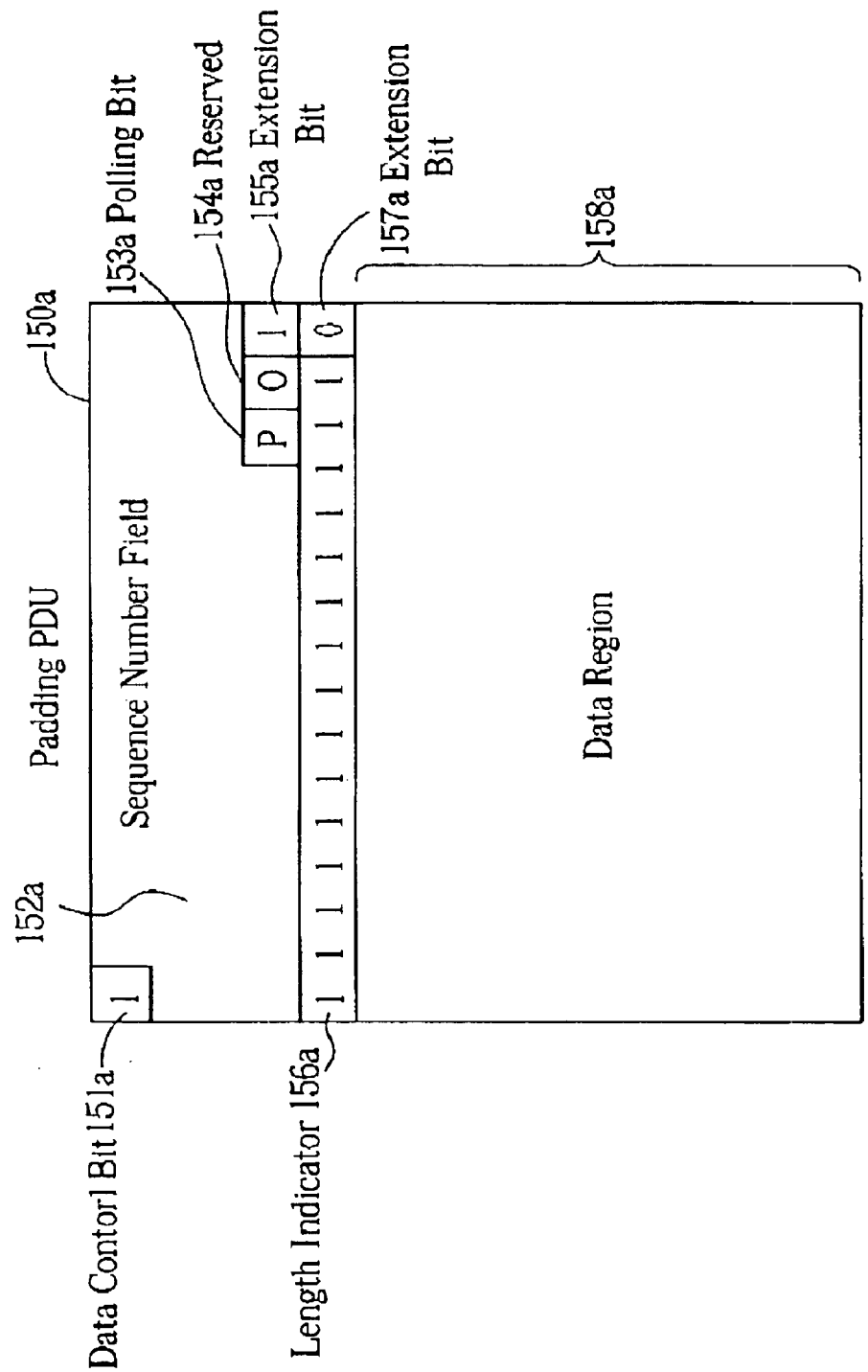
FIG. 8*a* is a detailed block diagram of an acknowledged mode padding protocol data unit (PDU).
Figure 8B:
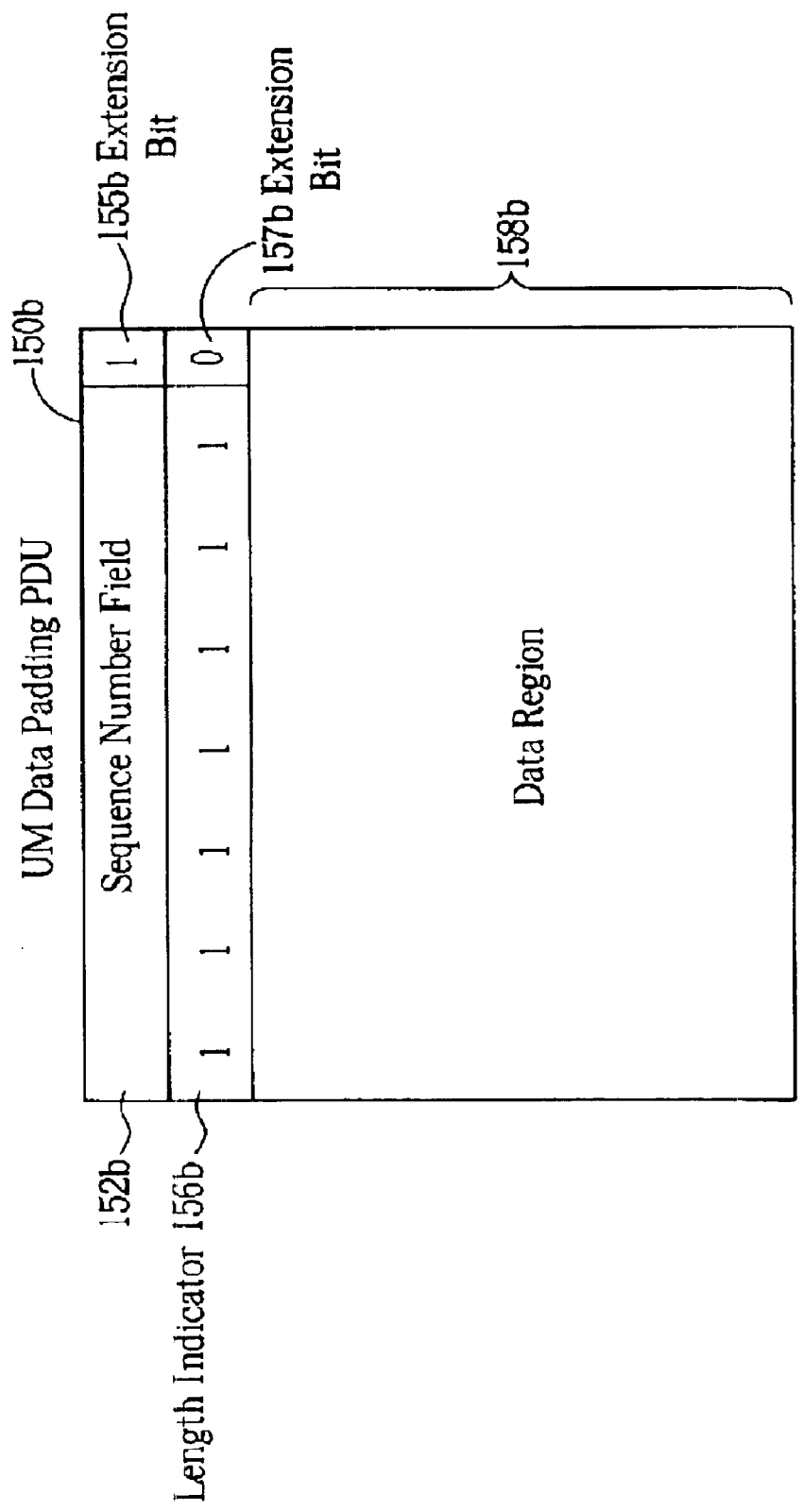
FIG. 8*b* is a detailed block diagram of an unacknowledged mode padding PDU.

In a first embodiment, it is the method of the present invention for the RLC layer 142 to provide at least one padding PDU 150 to the MAC layer 144 to fulfill a TFC data request from the MAC layer 144. The padding PDU 150 holds no actual SDU data 141, and is used when the SDU data 141 has been discarded due to an unexpected data interruption. Please refer to FIG. 8*a*. FIG. 8*a* is a detailed block diagram of a padding PDU 150. The padding PDU 150*a* is a standard acknowledged mode (AM) data PDU, and so the data/control bit 151*a* is set (i.e., equal to one). The sequence number field 152*a* is a standard sequence number, and the polling bit 153*a* is set or cleared as determined by the layer 2 interface 132 for status polling. Field 154*a* is reserved and cleared to zero, and the following extension bit 155*a* is always set to indicate a following length indicator (LI) 156*a*. The LI 156*a* holds a special code, however, which is a string of ones, and which far exceeds the length of the data region 158*a*. The actual bit size of the LI 156*a* depends on the LI size of the RLC entity and could be either 7 or 115. In FIG. 8*a*, an LI size of 15 bits is shown. This special LI 156*a* indicates that the rest of the PDU 150*a* is padding, holding undefined information that can be ignored. Nevertheless, the first bit after the LI 156*a*, an extension bit 157*a*, should be cleared to zero simply for the sake of consistency to indicate that the SDU data region 158*a* is beginning. The contents of the SDU data region 158*a* are undefined, and are unimportant filler. Note that under unacknowledged mode (UM) transport, a UM data PDU would be used for padding. FIG. 8*b* is a block diagram of a UM data padding PDU 150*b*. The UM data padding PDU 150*b* is relatively simpler in structure, with only a 7-bit sequence number field 152*b*, followed by an extension bit 155*b* that is set to one, a seven-bit LI 156*b* with all bits set to one to indicate following padding, and a final extension bit 157*b* that should be cleared to zero for the sake of consistency. The actual bit size of the LI 156*b* depends on the "largest UMD PDU size" of the UM RLC entity 142 configured by the upper layer 133, and could be either 7 or 15. In FIG. 8*b*, an LI size of 7 bits is shown. As before, because the entire PDU 150*b* is a padding PDU, the contents of the SDU data region 158*b* is undefined, and may hold anything.

The preferred embodiment utilizes padding PDUs 150 (PDUs 150*a* for AM RLC entity and PDUs 150*b* for UM RLC entity) to serve as substitute PDUs 150. These substitute PDUs 150 serve as filler in order to provide the MAC layer 144 the requisite number of properly sized PDUs to fulfill a TFC data request from the MAC layer 144.

Figure 9:
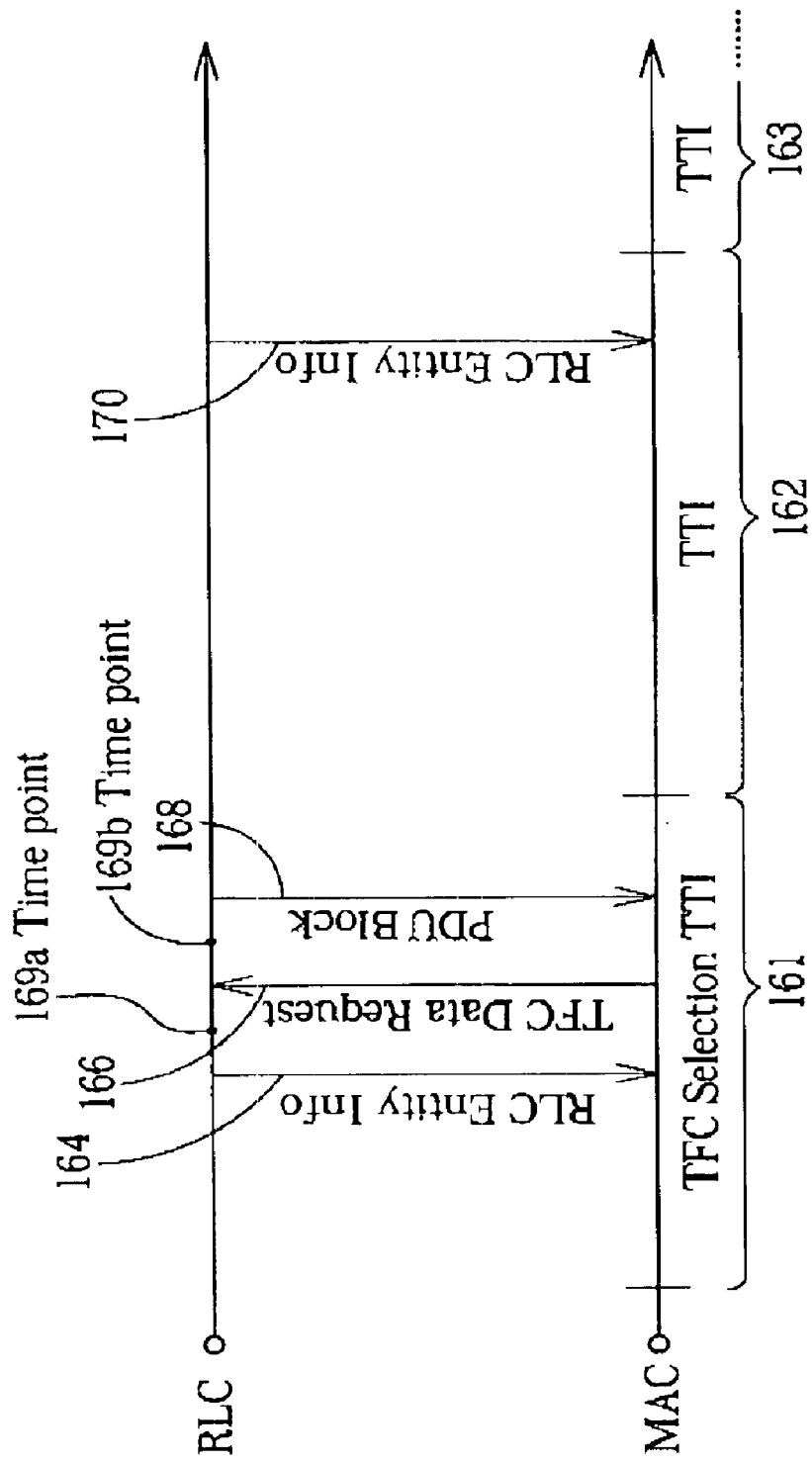
FIG. 9 is a timing diagram for data transmission according to the present invention.

Please refer to FIG. 9 with reference to FIGS. 7, 8*a* and 8*b*. FIG. 9 is a timing diagram for data transmission according to the present invention. As described previously, the MAC layer 144 allots the RLC layer 142 a series of transmission time intervals (TTIs) of equal duration. To effect data transmission in a TTI 162, data scheduling by way of TFC selection is performed in a prior TTI 161. To initiate TFC selection, the RLC layer 142 sends RLC entity information 164 to the MAC layer 144. As previously noted, the RLC entity information 164 indicates to the MAC layer 144 how much SDU data 141 the RLC layer 142 has in the buffer 143 awaiting transmission. Some time thereafter, the MAC layer 144 responds to the RLC entity information 164 with a TFC data request 166, which instructs the RLC layer 142 of the number of PDUs 145 to submit to the MAC layer 144, and the size the PDUs 145 are to have. The RLC layer 142 then segments the SDUs 141 into PDUs 145 that satisfy the requirements of the TFC data request 166, and submits the PDUs 145 as a block 168 to the MAC layer 144. This completes TFC selection for the TTI 162, and in TTI 162 TFC selection is performed for TTI 163.

An unexpected data interruption can occur at any time between the submission of the TFC entity information 164 to the MAC layer 144, and the submission of the block 168 of PDUs 141 to the MAC layer 144. For the first embodiment method, the unexpected data interruption may be due to a discard timer 133d that causes one or more SDUs 141 to be discarded for UM or AM RLC entities; suspend, stop and re-establish operations initiated by command primitives from the layer 3 interface 133 for UM or AM RLC entities; or a layer 2 AM RLC reset operation. As an example, the unexpected data interruption could occur at a time 169a that is prior to the TFC data request 166, or at a time 169b that is just after the TFC data request. In any event, should the unexpected data interruption 169a or 169b leave the RLC layer 142 with insufficient SDU data 141 to properly comply with the TFC data request 166, the RLC layer 142 constructs a sufficient number of properly sized padding PDUs 150 to fulfill the balance of the TFC data request 166. For example, if at time 169b a re-establish command primitive from the layer 3 interface 133 causes SDU data 141 in the buffer 143 to be discarded or interrupted for transmission, and the TFC data request 166 from the MAC layer 144 has requested 5 PDUs, each 220 octets in size, the RLC layer 142 will construct 5 padding PDUs 150, each 220 octets in size, and submit them as a block 168 to the MAC layer 144 to fulfill the TFC data request 166. The 5 padding PDUs 150 would thus stand in place of the SDU data 141 discarded or interrupted by the unexpected data interruption 169b from the re-establish operation. As another example, a discard event from the discard timer 133d in the layer 3 interface 133 may cause an SDU 141d to be discarded. This discarded SDU 141d may leave the RLC layer 142 one PDU short of fulfilling a TFC data request 166 that ordered 8 PDUs, each 150 octets in size. In this case, the RLC layer 142 would construct one padding PDU 150 to stand in place of the discarded SDU data 141d, combine it with other properly formed data PDUs 145, and submit the total as a block 168 to fulfill the TFC data request 166.

In the above, padding PDUs are used as substitute PDUs to fill in for SDU data that is no longer available. However, other types of PDUs besides simply padding PDUs may be used as substitute PDUs. For example, under AM transport, an illegal PDU having the reserved bit 154a set could be used as a substitute PDU. Or, old PDUs previously transmitted could be used as substitute PDUs. What is important is that some type of PDU be submitted to the MAC layer, in appropriate numbers and size, to fulfill a TFC data request.

In a second embodiment of the present invention, when an unexpected data interruption occurs after RLC entity information 164 is submitted to the MAC layer 144, then SDU data 141 that should be discarded or interrupted for transmission by the unexpected data interruption is not discarded or interrupted until the next TTI interval 162. Such an unexpected data interruption includes suspend, stop and reestablish operations initiated by command primitives from the layer 3 interface 133 for UM or AM RLC entity; or a layer 2 AM RLC reset operation. For example, an AM RLC reset operation may occur at time 169a or 169b that would normally cause all SDU data 141 and all PDUs 145 to be immediately discarded. However, according to the second embodiment method, discarding of data, be it SDUs 141 or PDUs 145, is delayed until the next TTI 162 so that the RLC layer 142 will have sufficient SDU data 141 to fulfill the TFC data request 166. If a data interruption were to occur after the block 168 is submitted to the MAC layer 144 to complete the TFC data request 166, and if the data interruption were also to occur before submission of RLC entity information 170 in the next TTI 162, then SDU data 141 and PDU data 145 could both be discarded, as the RLC layer 142 is not bound by the terms in a RLC entity information submission to the MAC layer 144.

In contrast to the prior art, the present invention ensures that TFC data requests are always fulfilled. This is managed by either submitting padding PDUs in place of PDUs that carry actual SDU data, or by delaying discarding or interruption of SDU data in response to the unexpected data interruption event until the next TTI. By ensuring that TFC data requests are always fulfilled, unexpected software problems are avoided, improving the operational stability of the wireless communications device.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for processing an unexpected data interruption in data transmission scheduling between a radio link control (RLC) layer and a medium access control (MAC) layer in a wireless communications device, the unexpected data interruption occurring after RLC entity information is provided by the RLC layer to the MAC layer and leaving the RLC layer with less ready-to-send SDU data than indicated in the RLC entity information, the method comprising:

the RLC layer submitting to the MAC layer an appropriate number of substitute protocol data units (PDUs) that are not control PDUs in place of discarded or interrupted service data unit (SDU) data in response to a data request by the MAC layer.

2. The method of claim 1 in which the unexpected data interruption is due to a discard timer, a reset operation, a suspend operation, a stop operation, or a re-establish operation.

3. The method of claim 1 in which the substitute PDUs are padding PDUs.

4. A method for data scheduling between a radio link control (RLC) layer and a medium access control (MAC) layer in a wireless communications device, the method comprising:

the RLC layer providing RLC entity information to the MAC layer, the RLC entity information indicating that the RLC layer has service data unit (SDU) data to be transmitted;

after providing the RLC entity information, the RLC layer receiving an unexpected data interruption that requires the RLC layer to discard or interrupt transmitting of the SDU data and leaves the RLC layer with less ready-to-send SDU data than indicated in the RLC entity information;

after the unexpected data interruption, the MAC layer requesting at least a protocol data unit (PDU) from the RLC layer in response to the RLC entity information, and the RLC layer submitting to the MAC layer at least a substitute that is not a control PDU in response to the MAC request;

wherein the at least a substitute PDU is submitted in place of the discarded or interrupted SDU data.

5. The method of claim 4 in which the number of substitute PDUs provided by the RLC layer to the MAC layer equals the number of PDUs requested by the MAC layer from the RLC layer.

6. The method of claim 4 in which the unexpected data interruption is due to a discard timer, a reset operation, a suspend operation, a stop operation, or a re-establish operation.

7. The method of claim 4 in which the at least a substitute PDU is a padding PDU.

8. A wireless communications device comprising a processor that executes a program for processing an unexpected data interruption in data transmission scheduling between a radio link control (RLC) layer and a medium access control (MAC) layer, the unexpected data interruption occurring after RLC entity information is provided by the RLC layer to the MAC layer and leaving the RLC layer with less ready-to-send SDU data than indicated in the RLC entity information the program causing:

the RLC layer to submit to the MAC layer an appropriate number of substitute protocol data units (PDUs) that are not control PDUs in place of discarded or interrupted service data unit (SDU) data in response to a data request from the MAC layer.

9. The wireless communications device of claim 8 in which the unexpected data interruption is due to a discard timer, a reset operation, a suspend operation, a stop operation, or a re-establish operation.

10. The wireless communications device of claim 8 in which the substitute PDUs are padding PDUs.

11. A wireless communications device comprising a processor that executes a program for performing data scheduling between a radio link control (RLC) layer and a medium access control (MAC) layer, the program causing:

the RLC layer to provide RLC entity information to the MAC layer, the RLC entity information indicating that the RLC Layer has service data unit (SDU) data to be transmitted;

the RLC layer to receive a data interruption after providing the RLC entity information, the data interruption requiring the RLC layer to discard or interrupt transmitting of the SDU data and leaving the RLC layer with less ready-to-send SDU data than indicated in the RLC entity information;

the MAC layer to request at least a protocol data unit (PDU) from the RLC layer in response to the RLC entity information; and the RLC layer to submit to the MAC layer at least a substitute PDU that is not a control PDU in response to the MAC request;

wherein the at least a substitute PDU is submitted in place of the discarded or interrupted SDU data.

12. The wireless communications device of claim 11 in which the number of substitute PDUs submitted by the RLC layer to the MAC layer equals the number of PDUs requested by the MAC layer from the RLC layer.

13. The wireless communications device of claim 11 in which the data interruption is due to a discard timer, a reset operation, a suspend operation, a stop operation, or a re-establish operation.

14. The wireless communications device of claim 11 in which the at least a substitute PDU is a padding PDU.

15. A method for processing an unexpected data interruption that is not due to a discard timer in data transmission scheduling between a radio link control (RLC) layer and a medium access control (MAC) layer in a wireless communications device, the unexpected data interruption occurring after RLC entity information is provided by the RLC layer to the MAC layer and leaving the RLC layer with less ready-to-send SDU data than indicated in the RLC entity information the method comprising:

postponing discarding or interruption of service data unit (SDU) data in response to the unexpected data interruption until the RLC layer submits a requested number of protocol data units (PDUs) to the MAC layer in response to a MAC request initiated by the RLC entity information.

16. The method of claim 15 in which the unexpected data interruption is due to a reset operation, a suspend operation, a stop operation, or a re-establish operation.

17. A method for data scheduling between a radio link control (RLC) layer and a medium access control (MAC) layer in a wireless communications device, the method comprising:

the RLC layer providing RLC entity information to the MAC layer, the RLC entity information indicating that the RLC layer has service data unit (SDU) data to be transmitted;

after providing the RLC entity information, the RLC layer receiving an unexpected data interruption that is not due to a discard timer, wherein the unexpected data interruption will leave the RLC layer with less ready-to-send SDU data than indicated in the RLC entity information;

after the unexpected data interruption, the MAC layer requesting at least a protocol data unit (PDU) from the RLC layer in response to the RLC entity information;

the RLC layer providing the MAC layer at least one PDU that is triggered to be discarded or interrupted by the unexpected data interruption in response to the MAC request; and after submitting the at least one PDU to the MAC layer, and in response to the unexpected data interruption, the RLC layer discarding or interrupting SDU data not submitted to the MAC layer.

18. The method of claim 17 in which all remaining SDU data is discarded by the RLC layer in response to the unexpected data interruption after the at least one PDU is submitted to the MAC layer.

19. The method of claim 17 in which the unexpected data interruption is due to a reset operation, a suspend operation, a stop operation, or a re-establish operation.

20. The method of claim 17 in which the number of the at least one PDU submitted by the RLC layer to the MAC layer equals the number of PDUs requested by the MAC layer from the RLC layer.

* * * * *